(12) United States Patent
Kabel

(10) Patent No.: US 10,234,534 B2
(45) Date of Patent: Mar. 19, 2019

(54) KALMAN FILTERED CORRELATION INTERFEROMETRY GEOLOCATION

(71) Applicant: BAE SYSTEMS INFORMATION AND ELECTRONIC SYSTEMS INTEGRATION INC., Nashua, NH (US)

(72) Inventor: Allan M. Kabel, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 240 days.

(21) Appl. No.: 15/273,258

(22) Filed: Sep. 22, 2016

(65) Prior Publication Data

US 2017/0082722 A1 Mar. 23, 2017

Related U.S. Application Data

(60) Provisional application No. 62/222,455, filed on Sep. 23, 2015.

(51) Int. Cl.
*G01S 5/02* (2010.01)
(52) U.S. Cl.
CPC .......... *G01S 5/0205* (2013.01); *G01S 5/0252* (2013.01)
(58) Field of Classification Search
CPC ........ G01S 5/0205; G01S 5/0252; G01S 5/02; G01S 5/021; G01S 5/14; H04W 64/00
USPC ........................................................ 342/451
See application file for complete search history.

(56) References Cited

U.S. PATENT DOCUMENTS

| | | | |
|---|---|---|---|
| 7,268,728 B1 | 9/2007 | Struckman | |
| 7,453,400 B2 | 11/2008 | Struckman et al. | |
| 2002/0165669 A1* | 11/2002 | Pinto | G01O 21/165 |
| | | | 701/408 |
| 2004/0042557 A1 | 3/2004 | Kabel et al. | |
| 2005/0110661 A1* | 5/2005 | Yannone | G01O 23/00 |
| | | | 340/945 |
| 2006/0087475 A1 | 4/2006 | Struckman | |
| 2008/0117106 A1 | 5/2008 | Samo et al. | |
| 2008/0186235 A1* | 8/2008 | Struckman | G01S 5/0221 |
| | | | 342/465 |
| 2010/0321241 A1* | 12/2010 | Janosky | G01S 3/785 |
| | | | 342/444 |
| 2016/0202359 A1* | 7/2016 | Kana | G01O 21/08 |
| | | | 701/468 |

FOREIGN PATENT DOCUMENTS

WO WO-2008051204 A2 * 5/2008 ........... G01S 5/0294

OTHER PUBLICATIONS

Estimation with Applications to Tracking and Navigation, by Y. Bar-Shalom, X. Rong Li, and Thiagalingam Kirubarajan (New York: John Wiley & Sons, 2001); see pp. 386-387.

* cited by examiner

*Primary Examiner* — Harry K Liu
(74) *Attorney, Agent, or Firm* — Sand, Sebolt & Wernow LPA; Scott J. Asmus

(57) ABSTRACT

A method and system for Kalman-Filtering in geolocation is provided. One aspect of the disclosure provides using an extreme geo program/method to converge on the location of an emitter, using a correlation function inherent in a Correlation Interferometry Geolocation (CIGL) program, and using Kalman filtering to find a peak correlation surface for an array.

17 Claims, 15 Drawing Sheets

KALMAN FILTERED CORRELATION INTERFEROMETRY GEOLOCATION

CROSS REFERENCE TO RELATED APPLICATIONS

This application claims the benefit of prior U.S. Provisional Application Ser. No. 62/222,455, filed on Sep. 23, 2015; the entire disclosure of which is incorporated herein by reference.

STATEMENT OF GOVERNMENT INTEREST

This application was made with U.S. Government support under Contract No. H94003-04-D-002 awarded by the Defense Microelectronics Activity (DMEA/MEE) Agency. The U.S. Government has certain rights in this invention.

TECHNICAL FIELD

The present disclosure relates generally to geolocation of an object. More particularly, the present disclosure relates to a method of locating precise coordinates of an object. Specifically, the present disclosure relates to the use of Kalman filtering Correlation Interferometer Precision Geolocation (CIGL) in locating position of an object.

BACKGROUND INFORMATION

Kalman filtering, also known as linear quadratic estimation (LQE), is a technique that uses a series of measurements observed over time, containing statistical noise and other inaccuracies, and produces estimates of unknown variables that tend to be more precise than those based on a single measurement alone. The Kalman filter is named after Rudolf E. Kalman, one of the primary developers of its theory.

The Kalman filter has numerous applications in technology. A common application is for guidance, navigation and control of vehicles, particularly aircraft and spacecraft. Furthermore, the Kalman filter is a widely applied concept in time series analysis used in fields such as signal processing and econometrics. The Kalman filter is also one of the main topics in the field of robotic motion planning and control for trajectory optimization.

The processing typically works in a two-step process. In the prediction step, the Kalman filter produces estimates of the current state variables, along with their uncertainties. Once the outcome of the next measurement(s) (necessarily corrupted with some amount of error, including random noise) is observed, these estimates are updated using a weighted average, with more weight being given to estimates with higher certainty. Because of the program's recursive nature, it can run in real time using only the present input measurements and the previously calculated state and its uncertainty matrix; no additional past information is required.

SUMMARY

An improved way, however, is needed to use the Kalman filter in geolocation when (1) very large arrays are used, (2) to converge on the optimum emitted location for any size of array, (3) accurate receiver phase compensation is not available, and (4) when there is an environment with measurements representing multiples emitters.

In accordance with one aspect, an embodiment of the present disclosure provides a solution for an improved geolocation method. Generally, an antenna array receives a radio transmission from a signal emitter. The antenna array is calibrated to identify the signal emitter position by taking a snapshot of the signal characteristics at a certain time.

In general, the emitted signal could be generated from anything that is capable of generating the same. Some examples include a stationary enemy person using a handheld radio communication device, or a moving vehicle. The emitted signal can be any type of signal, such as acoustic signals or others, provided the appropriate transducer is employed, however the present disclosure focuses on radio signals.

In general, the antenna array receives the signals that are emitted from the object. On the antenna array, each antenna may have an independent channel of processing. The data of each antenna is extracted. Ordinarily, each antenna captures relative phase information and relative amplitude information of the signal, amongst other actual signal characteristics. For example, if there is a one or two wavelength-spaced separation between the antennas in the array, the two antennas will see the amplitude and phase difference because one antenna is farther away from the emitter than the other antenna by a first distance (which could be a few meters). Thus, the second antenna observes a signal that has a different phase because the radio propagates at the speed of light. But still, over meters, a different phase is observable between the two antennas.

In general, the amplitude and phase from all of the antennas is captured to create a "snapshot" in time. Sometimes, a signal receiving platform carrying the antenna array may be moving (such as an antenna array mounted on a vehicle). Thus, another snapshot may capture data that is later in time when the platform is at a different location. This may be repeated such that several "snapshots" of data are generated. Alternatively, the system of the present disclosure may have multiple platforms that could all collect the data at the same time from the different locations. This would replace the first scenario of having a single platform carrying the antenna array that was moving. Thus, in accordance with the present disclosure a single platform receiving the signal can move and create two or more snapshots in time. The first time at a first location and at a second time at the second location. Alternatively, the present disclosure could have multiple platforms at different locations taking one snapshot at the same time. While the present disclosure would likely be able to formulate an approximate object location with only two snapshots, the features of one embodiment work better when a multitude of snapshots are compared. Essentially, the more snapshots that are taken, the uncertainty decreases (i.e., the certainty increases). The number of snapshots needed generally depends on the wavelength of the signal and the size of the array relative to the wavelength. In one exemplary non-limiting scenario, the geolocation system of the present disclosure works best with at least ten snapshots. Once the ten snapshots are collected and stored in a memory, the actual signal characteristics/information of the phase and the amplitude are stored for later use and calculations. The geolocation system may begin to analyze data while still collecting snapshots. Thus, the processing is observed in real time.

In general, after the snapshots are stored, the geolocation system generates a set of initial guesses that predict an estimated object location. In one embodiment, the initial guesses are arranged in a set of expanding semi-circles. Alternatively, if the geolocation system has prior information, it could narrow the area of where initial guesses are located. Thus, starting with the guesses, the system begins constructing a Kalman filter at each of the starting points based on the data at each guess location. In one particular embodiment, there is at least one Kalman filter associated with each one of the plurality of initial guess locations (also referred to herein as an observation pattern including a plurality of estimated location points). In one embodiment, each Kalman filter may be implemented as a function within a main processor. However, it is entirely possible to have a piece of hardware for each Kalman filter if utilizing some of these processors with cores. Thus, the geolocation system could have a core host a Kalman filter. Also, the geolocation system could have a Kalman filter in the hardware or have a different function, or mini-processor for each Kalman filter.

In general, the geolocation system uses the first two snapshots and the Kalman filter is using those two snapshots to improve the guess and then the geolocation system will mix in a third snapshot to improve the guess until all of the snapshots have been used by the geolocation system. Once the geolocation system has used up all the data from the snapshots, the Kalman filter has gone as far as it can. In the interim, while the Kalman filters are processing the snapshots, some of the Kalman filters are starting so far away from the actual object location that they go off into nothing. The geolocation system includes a supervisory process that indicates if a Kalman filter is clearly going in the wrong direction, then the supervisory process deletes or stops that Kalman filter from proceeding. Conceptually, the supervisory process deletes the Kalman filter and leaves the remainder to their work. As the geolocation system and process continues, the end goal is to be left with a single Kalman filter that worked towards the correct answer. Most likely, there will be at least two of the Kalman filters that actually converge on the same answer and the supervisory program says that these are really close together so merge the two into one. The new one can continue on with more data. The supervisory program utilizes a correlation threshold to determine whether one particular Kalman filter is going off in the wrong direction and should be deleted. In one general non-limiting example, the correlation threshold could be in a range from 0.85 to 0.99. However, in some particular experiments the correlation threshold was 0.9.

Generally thereafter, the Kalman filter along with its current guess, attempts to maximize a correlation function. Essentially, each Kalman filter begins at an arbitrary location and each Kalman filter is trying to find the peak of the correlation surface, which is the best guess as to where the object is. They are all going to go after the peaks but there may be many peaks depending on the way the surface looks. Most of the peaks are merely local peaks, not the utmost global peak of the correlation surface.

In general, the Kalman filters then make use of the extreme geo program method/process. The "extreme geo" program is a correlation function based on the actual signal characteristics. The extreme geo takes the actual signal characteristics/data and combines it in a certain way and creates a correlation surface. Generally, the extreme geo process tends to limit itself mostly to the phase information of the signal. The correlation surface built from the extreme geo program is what the Kalman filters are trying to maximize. The extreme geo program is used in part because the extreme geo correlation surface has fewer peaks and valleys relative to other known methods of construction correlation surfaces. Thus, the extreme geo-based correlation surface is smoother than other known correlation surface construction techniques.

In general, once the extreme geo program has run its course, the system switches to a Correlation Interferometry Geolocation (CIGL) program. The switch from extreme geo to CIGL is done when the extreme geo has used up all the data and come to final location guess (i.e., the global peak), then the geolocation systems switches over to the CIGL program. The CIGL program uses some of the same data as the extreme geo program (i.e., the actual signal characteristics such as phase and amplitude) but the CIGL program calculates a better result if it starts out near the global peak. However, the CIGL program is a busier process than the extreme geo (i.e., CIGL creates a more complex correlation surface because it utilizes more input data; the CIGL uses both the amplitude and the phase information, whereas extreme geo tended to only use phase information). This is part of the reason it can be more accurate, it is more efficient to only use the CIGL program after the global peak has been broadly identified through the extreme geo technique. Applying the process in this sequential manner makes it easier for the CIGL to go right to the global peak and not get stuck on a non-global peak.

In general, the GIGL program utilizes the phase and amplitude information to estimate the expected signal characteristic at a given location. For example, looking to one snapshot of data, there may be amplitude and phase of the signal from eight antennas in an antenna array. Thus, the geolocation system could indicate that if an emitter is located at a point 0,0 (for an X,Y grid), the system should expect the amplitude phase from all the antennas to have certain expected features/characteristics. Then, since the system knows the actual signal measurement at the antenna, the system establishes a correlation value between the actual and expected signal characteristics. The system could repeat this iterative process by estimating what an emitter signal should look like at point 1,0 (for the same X, Y grid). Then, the system could repeat the correlation process for the expected vs. actual signal characteristics. This continues as a pattern of matching and comparing the expected values with the actual values. Over the course of all the snapshots, a grid is formed and the emitter may be located (i.e., where the object is located) based on the best matching correlation between the expected and actual/observed signal characteristics.

In a general summary and to recap, from the signal characteristics (i.e., the phase and amplitude) received by the antenna array, the present disclosure transforms the data using a sequential Kalman CIGL extreme geo formula to locate the object. The Kalman CIGL extreme geo formula of the present disclosure is a hybrid calculation of three previously known methods that have not heretofore been applied together. First, Kalman filters are applied to a plurality of initial guess locations and the signal characteristics are observed relative to predicted signal characteristics. Then, an extreme geo function is utilized to build surface projection. Then, a CIGL function is utilized to build a more focused and higher resolution surface projection around a global peak to establish the actual object location.

In accordance with one exemplary aspect, an embodiment of the present disclosure may provide a geolocation method comprising: establishing an observation pattern including a plurality of estimated location points; associating at least one Kalman filter with the each one of the plurality of location estimation points; predicting at each Kalman filter a predicted signal characteristic; observing an actual signal characteristic emitted from an object at an unknown location at each Kalman filter; correlating the actual signal characteristic with the predicted signal characteristic; creating a surface projection including approximate local peaks and an approximate single global peak with an extreme geo program using a portion of the actual signal characteristics; switching from the extreme geo program to a CIGL algorithm for a region around the approximate single global peak; locating the global peak of the surface projection with the CIGL program and associating an actual location of the object at the global peak of the mapped surface.

In accordance with another exemplary aspect, an embodiment of the present disclosure may provide a geolocation system comprising: a first antenna and a second antenna spaced apart by a first wavelength; an emitter at an unknown location emitting a signal having an amplitude and a phase, wherein the first and second antenna intercept the signal; a plurality of initial guess locations; a plurality of Kalman filters, wherein at least one Kalman filter is associated with each of the plurality of initial guess locations; a correlation metric operatively connected with the Kalman filter adapted to determine whether the initial guess location is likely to identify an actual location of the emitter; a first snapshot at a first time capturing the amplitude and phase of the signal at the first and second antenna relative to a first guess location; a second snapshot at a later second time capturing the amplitude and phase of the signal at the first and second antenna relative to a second guess location; an extreme geo program identifying a global peak and at least one local peak of a surface projection using at least the amplitude of the emitted signal; a CIGL program identifying the global peak using the amplitude and phase of the emitted signal; and an actual location of the emitter determined by the global peak of the surface projection identified by the CIGL program.

BRIEF DESCRIPTION OF THE DRAWINGS

A sample embodiment of the disclosure is set forth in the following description, is shown in the drawings and is particular and distinctly pointed out and set forth in the appended claims. The accompanying drawings, which are fully incorporated herein and constitute a part of the specification, illustrate various examples, methods, and other example embodiments of various aspects of the invention.

Similar numbers refer to similar parts throughout the drawings.

DETAILED DESCRIPTION OF THE EMBODIMENT

The present disclosure relates generally to a geolocation system and method for providing precise geolocation information of a moving or stationary object using Kalman-Filtered Correlation Interferometry Geolocation (CIGL). The Kalman-Filtered CIGL of this disclosure is a geolocation technique applicable to areas of ELINT (electronic intelligence), SIGINT (signal intelligence) and COMINT (communications intelligence). The geolocation system and method of the present disclosure may be used for the large arrays currently proposed in the ELINT community because it provides a practical way to converge on the emitter's (target's) location. The geolocation system and method of the present disclosure can also be used for arrays of any aperture because it provides an efficient way to converge on the optimum emitter location estimate. Further, the geolocation system and method of the present disclosure has the capability of performing geolocation without the need for accurate receiver phase compensation. The geolocation system and method of the present disclosure provides the capability to determine geolocations, even when confronted with a hodge-podge of measurements representing multiple emitters. This applies to scenarios such as a simple network or a dense environment filled with pulsed non-overlapping signals.

Figure 1:
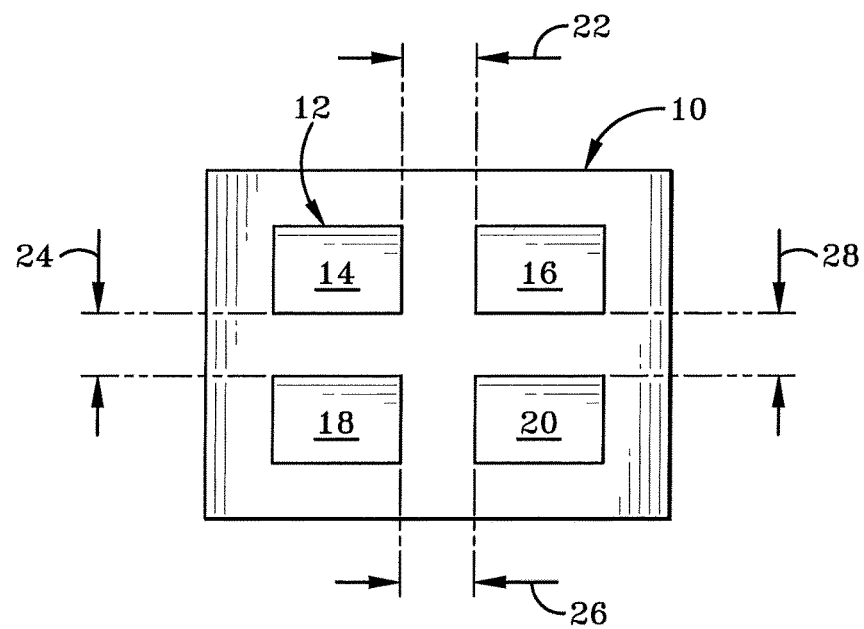
FIG. 1 is an exemplary schematic view of an antenna array carrying at least two antennas spaced apart at a distance.

As depicted in FIG. 1, a signal receiving platform 10 carries an array of antennas 12. In one particular embodiment, the platform 10 carries a first antenna 14, a second antenna 16, a third antenna 18, and a fourth antenna 20 collectively defining the array 12. The first and second antennas 14, 16 are separated apart with a first distance 22, which is ordinarily measured in wavelengths λ. Furthermore, the first and third antennas 14, 18 are separated apart by a second distance 24, which is ordinarily measured in wavelengths λ. The third and fourth antennas 18, 20 are spaced apart by a third distance 26, which is ordinarily measured in wavelengths λ. The second and fourth antennas 16, 20 are spaced apart by a fourth distance 28, which is ordinarily measured in wavelengths λ. In one particular embodiment, the first through fourth distances are all equal. However, there may be instances where it could be advantageous to vary these distances. Moreover, while the platform 10 is depicted as carrying an array 12 formed from four antennas, alternative numbers of antennas is possible. Even further, a system may be constructed utilizing multiple platforms that are operatively connected yet physically distinct such that they move independently.

Figure 2:
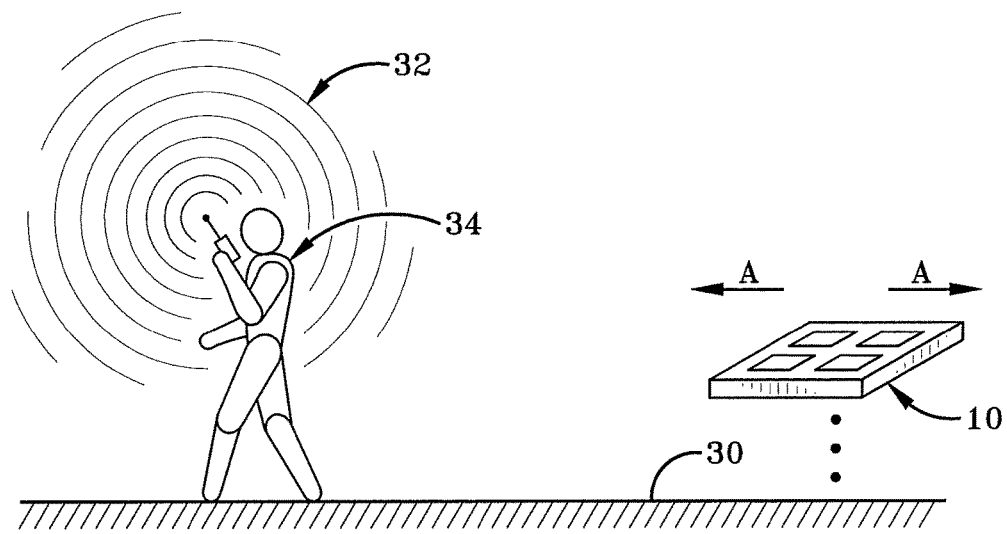
FIG. 2 is a schematic environmental view of the antenna array positioned moveable relative to ground in order to intercept a signal emitted from an emitter or object.

As depicted in FIG. 2, platform 10 is shown as being moveable relative to ground 30 as indicated by movement arrows A. It is to be understood to one having ordinary skill in the art that platform 10 may be mounted on a vehicle, or carried by an operator in order to enable platform 10 carrying antenna array 12 to move relative to ground 12.

FIG. 2 further depicts the antenna array 12 carried by platform 10 receiving a radio transmission signal 32 from a moving or stationary object 34. The emitted signal 32 is therefore either stationary or moving. Furthermore, the signal 32 can be electrical, magnetic, or acoustic, or any other emitted signal capable of being intercepted by the antenna array 12.

Generally, antenna array 12 is arranged in a manner that receives the transmitted signal 32 such that the signal 32 can be calibrated to find out the exact location of the object 34. The geolocation system and method of the present disclosure also allows to find the direction of arrival of the signal 32.

One embodiment may utilize a single platform 10. As will be described in greater detail below with respect to FIG. 4, the platform 10 moves and takes several snapshots of the incoming signal 32 at different locations. Alternatively, other embodiments can utilize multiple platforms to collect the signal data at the same time. In this instance, multiple platforms 10 are stationary and can take a snapshot of the signal 32 at a single time. The number of snapshot depends on the wavelength of the signal and the size of the array relative to the wavelength in general. Particularly, the more the snapshots, the more accurate it will be. Even though two snapshots will conceivably work, however, there would be a lot of uncertainty associated with it. In one embodiment, about ten snapshots are sufficient to reduce uncertainty.

In both cases, as the platform 10 receives the signal 32, it picks up relative amplitude and phase by each antenna in the array 12. Moreover, each platform 10 may receive relatively different amplitude and phase of the signal 32 than the other platform because one platform 10 may move at different places to take the signal 32, or each platform 10 is located farther away from the signal emitter (i.e., object 34) than the other platform.

Figure 3:
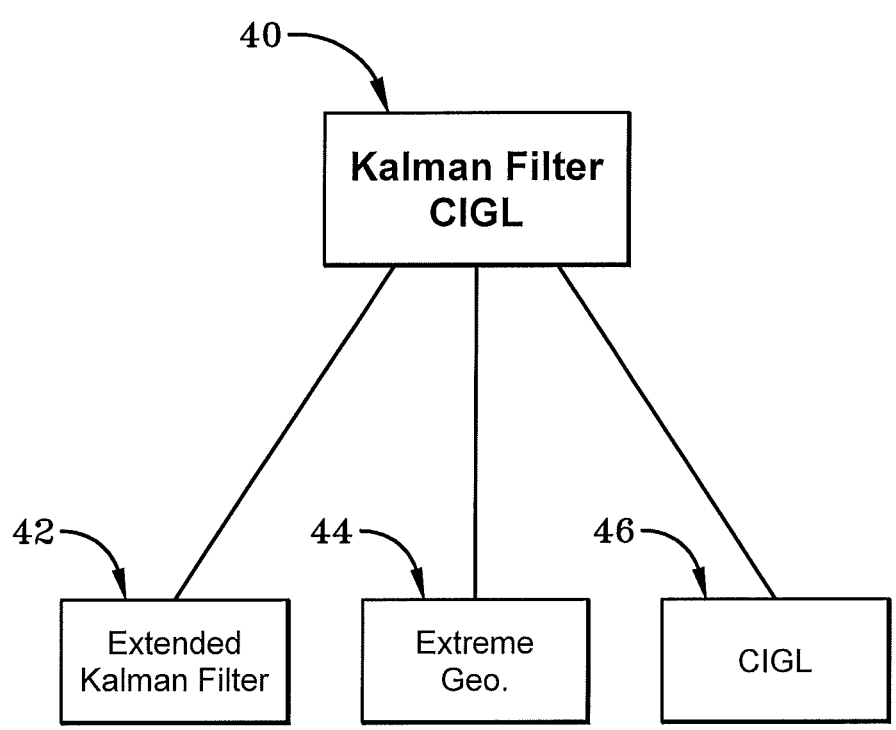
FIG. 3 is a schematic view of a Kalman filter CIGL process in accordance with the present disclosure comprising an extended Kalman filter, an extreme geo program, and a CIGL program.

As depicted in FIG. 3, the geolocation system implements a Kalman filtered CIGL process 40 which is collectively formed from a plurality of extended Kalman filters (EKF) 42, an "extreme geo" program 44, and a Correlation Interferometry Geolocation (CIGL) program 46. In particular, the extreme geo program 44 provides a smoother correlation surface which simplifies the search for maximum peak which will be described in greater detail below. As an added benefit of the extreme geo 44, the computations can now be done without phase-compensating the receiver chain. The CIGL 46 jointly optimizes the correlation using all antennas (input sources) simultaneously. Lastly, the extended Kalman filters (EKF) 42 provide an efficient way to find the peak correlation surface for most arrays (including sparse arrays with ambiguities). All three methods are integrated into the Kalman-filtered CIGL process 40.

More specifically, the extended Kalman filter (EKF) 42 is the nonlinear version of the Kalman filter (KF) which linearizes about an estimate of the current mean and covariance. In extended Kalman filter (EKF), the state transition and observation models need not be linear functions of the state but may instead be nonlinear functions because the extended Kaltman filter 42 can be modified internally during update by iteration until convergence of state update. Particularly, at each time step, the Jacobian is evaluated with current predicted states. This process essentially linearizes the nonlinear function around the current estimate.

A more detailed description of the EKF 42 is described in the book, *Estimation with Applications to Tracking and Navigation*, by Y. Bar-Shalom, X. Rong Li, and Thiagalingam Kirubarajan (New York: John Wiley & Sons, 2001); see pages 386-387, the entirety of the book *Estimation with Applications to Tracking and Navigation* is incorporated by reference as if fully rewritten herein.

An exemplary "extreme geo" 44 process or program can be summarized by the following extreme geo equations: Correlation in both CIGL and extreme geo is done over the set of antennas, and over time (i.e. over all the snapshots.) In practice, the correlations are done in nested loops. With CIGL, the normalized correlation over the set of antennas is done in the "inner" loop, and then the resulting correlations are summed over time (i.e. snapshot) in the "outer" loop.

Extreme geo reverses this order. Each inner loop sums the relative responses from a particular antenna over all the available snapshots:

$$R_i^2(x, y, z) = \frac{\left|\sum_{n=1}^{N} v_i^*(n) u_i(n, x, y, z)\right|^2}{\sum_{n=1}^{N} |v_i(n)|^2 \sum_{n=1}^{N} |u_i(n, x, y, z)|^2} \quad (1)$$

Where $v_i(n)$ is the measured antenna response from antenna i, at snapshot n, and $u_i(n,x,y,z)$ is the expected response from a source at location (x,y,z), received by the platform at snapshot n. (In all, there are N snapshots.) Each of these antenna-wise correlations may then be summed, in the "outer" loop, over the set of L antennas, to produce a correlation surface:

$$R^2(x, y, z) = \frac{1}{L} \sum_{i=1}^{L} R_i^2(x, y, z) \quad (2)$$

As with the CIGL 46 method (described below), the best estimate of the emitter's position is the (x,y,z) location which maximizes this correlation:

$$(\hat{x}, \hat{y}, \hat{z}) = \operatorname{argmax}_{(x,y,z)} [R^2(x,y,z)] \quad (3)$$

One such CIGL system is taught in PCT Patent application No. US 2004/03373, filed Feb. 6, 2004, and entitled "Correlation Interferometer Geo-location". Another such GIGL system is taught in U.S. patent application Ser. No. 11/249,922, filed Oct. 13, 2005, and entitled "Moving Transmitter Correlation Interferometer Geo-location", each of which is herein incorporated by reference as if fully rewritten in its entirety.

A brief overview of the CIGL 46 method can be given by way of analogy with Correlation Interferometry Direction Finding (CIDF). This method measures a phasor for a snapshot over N antennas, which may be represented by a complex N-vector $\underline{v}$. The CIDF program then correlates $\underline{v}$ against every vector in the database $\underline{u}(f,\theta)$, covering a dense set of azimuths $\theta$ at the given frequency f $$R^2(f, \theta) = \frac{|\underline{v}^H \underline{u}(f, \theta)|^2}{[\underline{v}^H \underline{v}][\underline{u}^H(f, \theta)\underline{u}(f, \theta)]} \quad (4)$$

For a single snapshot of data, the CIDF solution is the $\theta$ giving the highest correlation $$\hat{\theta} = \underset{\theta}{\mathrm{argmax}}[R^2(f, \theta)] \quad (5)$$

If multiple snapshots are use, one way to combine them in a predetection fashion is to functionally average N correlations and pick the maximum average:

$$\overline{R}_N^2(\theta) = \frac{1}{N}\sum_{n=1}^{N} R_n^2(f_n, \theta) \quad (6)$$

$$\hat{\theta}_N = \underset{\theta}{\mathrm{argmax}}[\overline{R}_N^2(\theta)] \quad (7)$$

(Note the frequencies of the constituent correlations may all be different.) Also, one may need to consider using a weighted average correlation $$\overline{R}_N^2(\theta) = \frac{1}{\sum_{n=1}^{N}(\underline{v}_n^H \underline{v})} \sum_{n=1}^{N} (\underline{v}_n^H \underline{v}) R_n^2(f_n, \theta) \quad (8)$$

if the signal quality varies appreciably over the snapshots.

Now consider the innovation that fuels CIGL 46. Rather than searching over azimuth $\theta$, CIGL 46 searches over a grid of points in space (x,y,z). (Note the spatial points could also be expressed in latitude/longitude/altitude.) The goodness-of-fit metric is still the correlation $$R^2(f, x, y, z) = \frac{|\underline{v}^H \underline{u}(f, x, y, z)|^2}{[\underline{v}^H \underline{v}][\underline{u}^H(f, x, y, z)\underline{u}(f, x, y, z)]} \quad (9)$$

and in analogy the Equation (2) the geolocation fix is the point with the highest correlation $$(\hat{x}, \hat{y}, \hat{z}) = \underset{(x,y,z)}{\mathrm{argmax}}[R^2(f, x, y, z)] \quad (10)$$

Carrying the analogy further, we can average multiple snapshots correlations to produce a better answer $$\overline{R}_N^2(x, y, z) = \frac{1}{N}\sum_{n=1}^{N} R_n^2(f_n, x, y, z) \text{ and} \quad (11)$$

$$(\hat{x}, \hat{y}, \hat{z})_N = \underset{(x,y,z)}{\mathrm{argmax}}[\overline{R}^2(x, y, z)] \quad (12)$$

(One may also use a weighted average correlation in place of Equation (11).)

The aforementioned equations 4-12 briefly summarize the CIGL 46 method. Sometimes, a remaining task is to prescribe how to generate the response vectors $\underline{u}(f,x,y,z)$ for all the spatial points and frequencies. This remaining task may be difficult because the calibration tables are based on azimuth: the aforementioned $\underline{u}(f,\theta)$ vectors. Conceptually, the change of variables is easily accomplished through a mapping between angle $\theta$ and location (x,y,z). Platform position $(x_p, y_p, z_p)$ is also a factor.

$$\underline{u}(f,x,y,z) = \underline{u}(f,\theta(x,y,z,x_p,y_p,z_p)) \quad (13)$$

For a particularly simple example, if it is assumed the emitter lies on a Euclidean plane, the mapping is:

$$\theta = \frac{\pi}{2} - \mathrm{Arctan}\left[\frac{y - y_p}{x - x_p}\right] \quad (14)$$

would suffice. In the more realistic and accurate case we model the mapping in terms of latitude, longitude, and altitude, and we include elevation angle (if available).

The final key to CIGL 46 is to define the interpolation scheme to use when mapping azimuth to position. Interpolation is necessary because most positions will correspond to azimuths between table values. Good results were achieved by interpolating amplitude and phase values separately using Matlab's cubic spline interpolation. Matlab is a computational application published by The Mathworks.

With reference back to the schematic of FIG. 3, in one embodiment, the Kalman filter CIGL 40 is used for stationary emitters. However, in another embodiment, the Kalman filter CIGL 40 can be adapted to track moving emitters (targets) and adapted to a special case-of-interest including ambiguity resolution, for large arrays, while flying toward the emitter. Furthermore, the Kalman filter CIGL 40 may include capability to do polarization-independent processing (straightforward).

Figure 4:
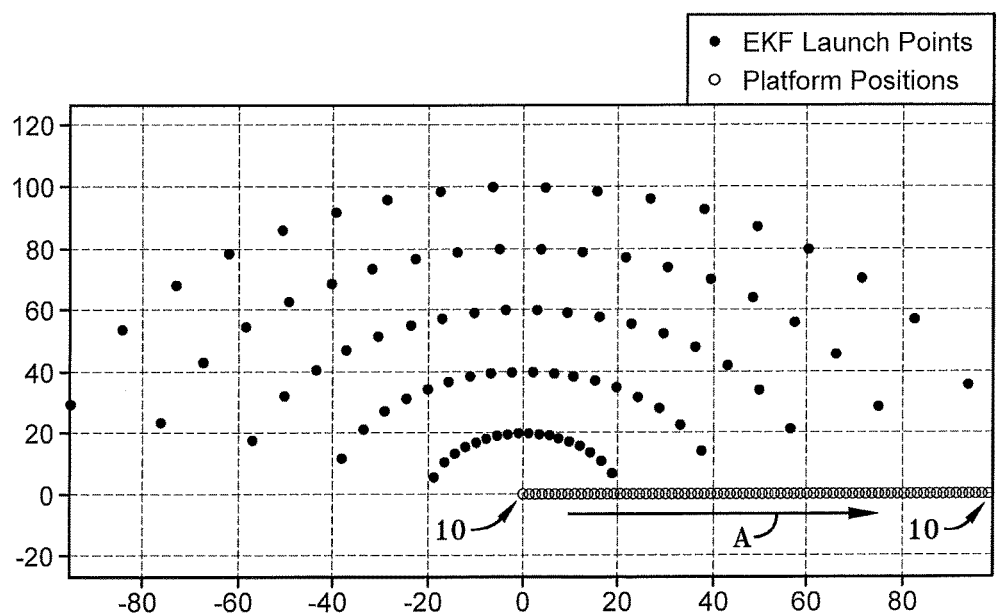
FIG. 4 is a graph depicting an exemplary pattern of initial EKF launch points utilized by the Kalman filter CIGL program.

In operation, after collecting the phase and amplitude information, a set of initial guesses is generated as depicted in FIG. 4. If there is prior information about the location of the target, a user may narrow the area of search where to put his/her initial guesses. Each starting point has the Kalman filter 20 associated with it. For instance, if there's a hundred starting points or a hundred guesses, there should be at least a hundred Kalman filters 20 associated with each guess.

Then, the Kalman filter 20 uses the first one or two snapshots to improve the guess and then it will mix with the third snapshot to improve the guess until it uses all snapshots. Once the Kalman filter 20 has used up all the data from the snapshots, the Kalman filter 20 has gone as far as it can. In the meantime, some of the Kalman filters 20 are starting far away from the true target point. If the Kalman filters 20 are clearly going in the wrong directions, they need to be deleted or eliminated from further calculation. In the end, one of the Kalman filters 20 may work toward the correct answer. More likely, a couple of the Kalman filters 20 may actually converge on the same answer. If they are determined to be really close together, then they can be merged into one.

By doing so, the extreme geo 30 is introduced. The extreme geo 30 is a function in the Kalman filter 20. Particularly, the extreme geo 30 does a correlation function. The extreme geo 30 takes the data and combines it in a certain way and creates a correlation surface from it and that's what the Kalman filters 20 are trying to maximize. The Kalman filter 20 uses the extreme geo 30 because the extreme geo 30 makes a surface with fewer peaks and valleys. Technically, it makes a smooth surface so that the Kalman filter CIGL 10 requires fewer starting points to reduce chances to be stuck in local peaks. When the results are near or at the global peak, then the CIGL 40 is introduced and uses the same data as extreme geo 30 used to calculate a better result. More particularly, when the extreme geo 30 has used up all the data and come to final location guess, the CIGL is introduced. Although the extreme geo 30 tends to limit itself mostly to the phases information, the CIGL 40 uses both the amplitude and the phase information so that the CIGL 40 can produce a more accurate location of the object.

Alternatively, if the object is moving, then the location is averaged over the snapshot time. For instance, if the snapshots are measured over ten seconds and the object is moving at ten feet per second, then the result will be an average within a hundred feet of where it was. In particular, the Kalman filtered CIGL 40 can model movement by using its guesses first at a starting point and then using a uniform direction and speed to plot the direction and speed of the moving object.

Figure 3A:
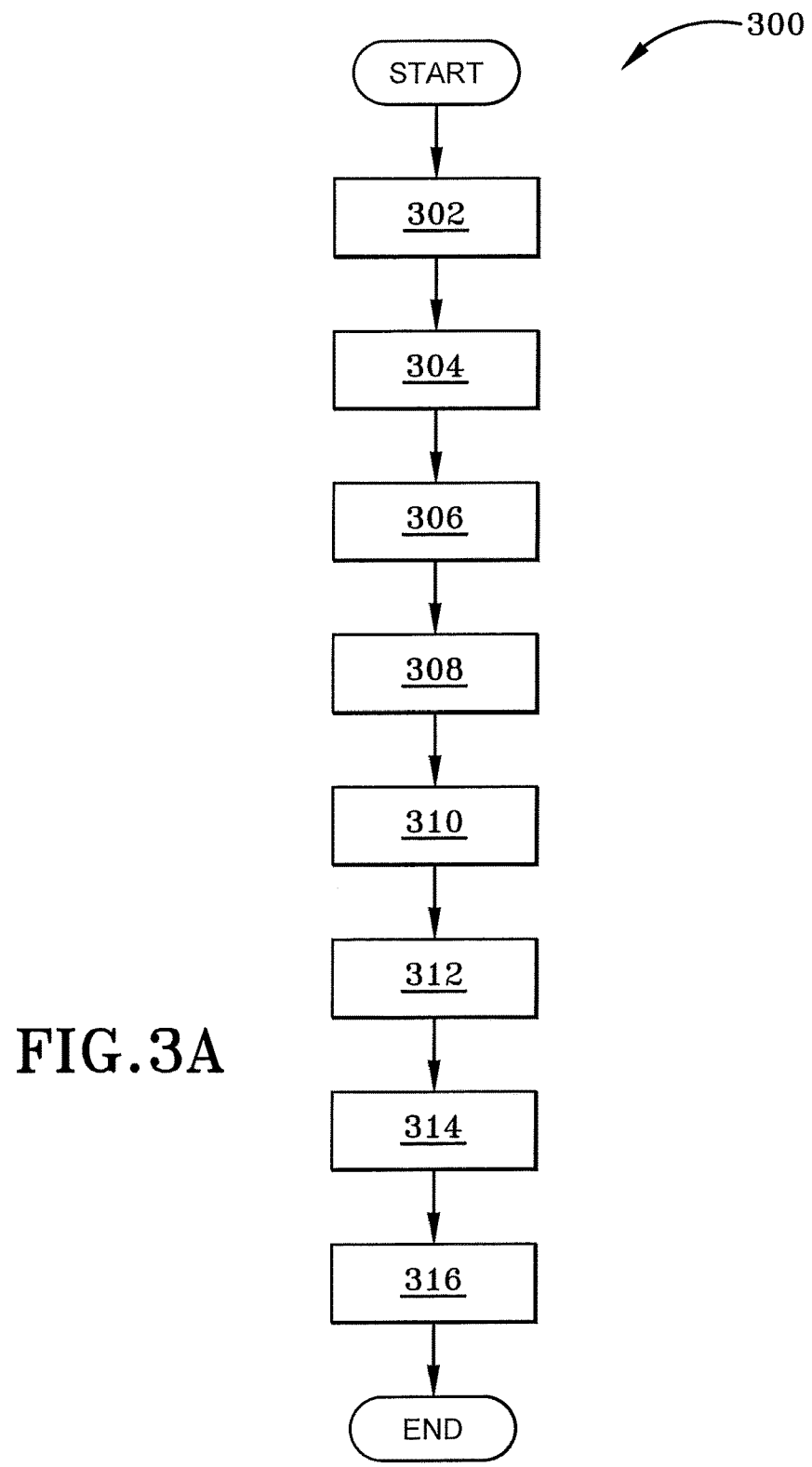
FIG. 3A is a flow chart of an exemplary method in accordance with the present disclosure.

FIG. 3A depicts a flow chart representing an exemplary method in accordance with the present disclosure and the method shown generally at 300. The method 300 may comprise the steps of: establishing an observation pattern (similar to that shown in FIG. 4) including a plurality of estimated location points, show generally at 302; associating at least one Kalman filter with the each one of the plurality of location estimation points, shown generally at 304; predicting at each Kalman filter a predicted signal characteristic, shown generally at 306; observing an actual signal 34 characteristic emitted from an object 32 at an unknown location at each Kalman filter, shown generally at 308; correlating the actual signal characteristic with the predicted signal characteristic, shown generally at 310; creating a surface projection including approximate local peaks and an approximate single global peak with an extreme geo program 44 using a portion of the actual signal characteristics, shown generally at 312; switching from the extreme geo program 44 to a Correlation Interferometry Geolocation (CIGL) program 46 for a region around the approximate single global peak, shown generally at 314; and locating of the global peak of the surface projection with the CIGL program 46 and associating an actual location of the object at the global peak of the mapped surface, shown generally at 316.

FIG. 4 depicts an exemplary graph of multiple EKF 42 launch points. The launch points are indicated as black dots in FIG. 4. Moreover, the graph of FIG. 4 indicates that there are eighteen EKF arranged in a semicircular field of view. Moreover, there are five sets of eighteen EKF launch points at different distances. The five rows of eighteen EKF launch points establish a preselected pattern for an efficient finding of the object emitting the signal. While the semicircular views are depicted in this particular embodiment, other patterns may be established as one having ordinary skill in the art would easily understand. The platform 10 is initially positioned at point 0,0 and moves in the direction of arrow A over time as the platform moves relative to the ground 30. Further, the platform 10 carrying the antenna array 12 in this particular example has a first distance 22, a second distance 24, a third distance 26, and a fourth distance 28 of nine wavelengths respectively spacing the first, second, third, and fourth antennas on the array 12. It can further be seen that as the platform moves in the direction of arrow A from point 0,0 to point 100,0, and multiple snapshots may be taken along the way. Overlapping circles of the platform positions indicated in FIG. 4 represent snapshots in time as the platform is moving from point 0,0 to point 100,0. And in this particular example, the platform positions indicate that there are one hundred measurements being taken between point 0,0 and point 100,0.

Figure 6:
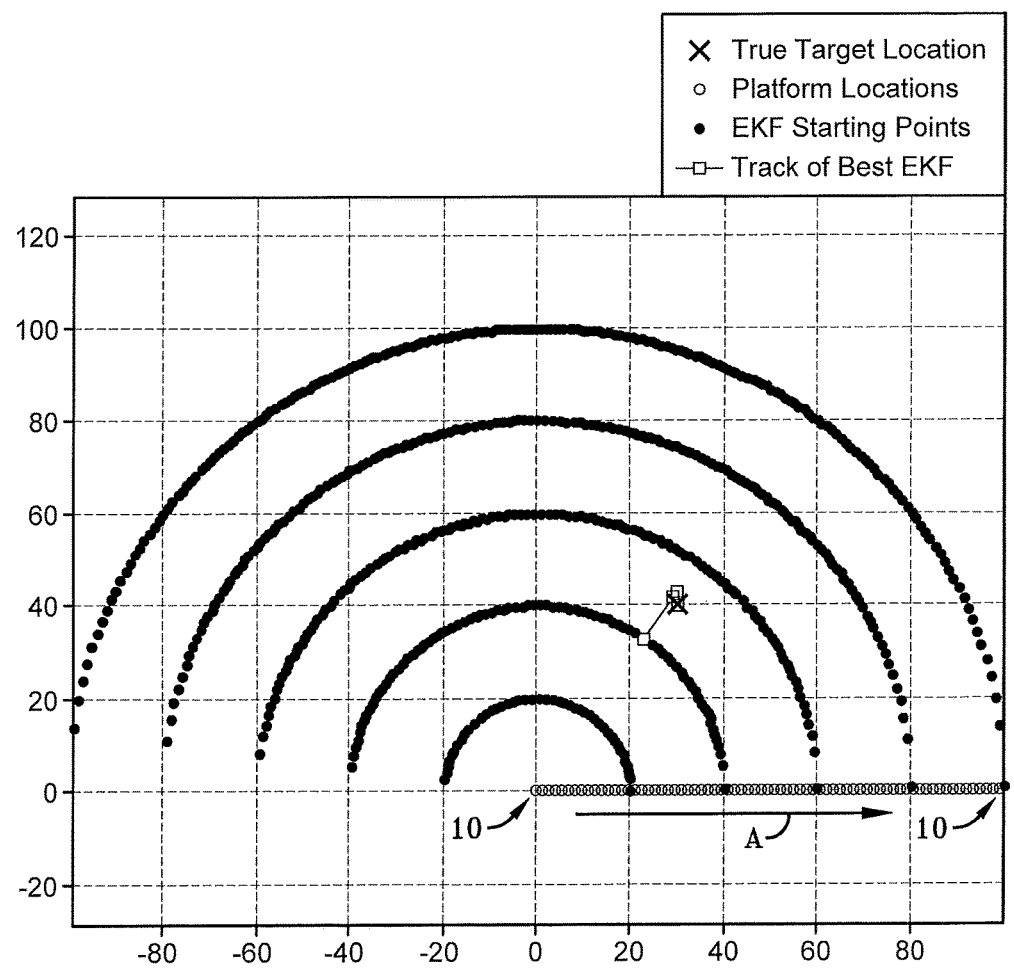
FIG. 6 is a graph representing an experimentation accomplished by the Kalman filter CIGL process of the present disclosure depicting five rows of one thousand EKF starting points and establishing a track line for the best EKF to determine a true target location.

FIG. 6 depicts an alternative scenario where there are five different ambiguity angles of one thousand EKF in each row forming concentric semicircular patterns for the initial measurement phase. Furthermore, the platform 10 position moves in the direction of arrow A from point 0,0 to point 100,0 in FIG. 6.

FIG. 6 depicts that there are one hundred measurements or snapshots taken of the platform 10 moving in the direction of arrow A from point 0,0 to point 100,0. Each ambiguity angle defining one of the five rows has one thousand EKF launch points on it, as depicted in FIG. 6. In FIG. 6, the object 34 emitting a signal 32 is represented by an X for the true target location, which is approximately at point 30,40. As the platform begins to move and snapshots or measurements are taken, the number of remaining EKF starting points for each location begins to decrease as indicated in FIG. 5 until the geolocation system of the present disclosure utilizing the Kalman CIGL process 40 described above begins to narrow in on the true target location.

Figure 5:
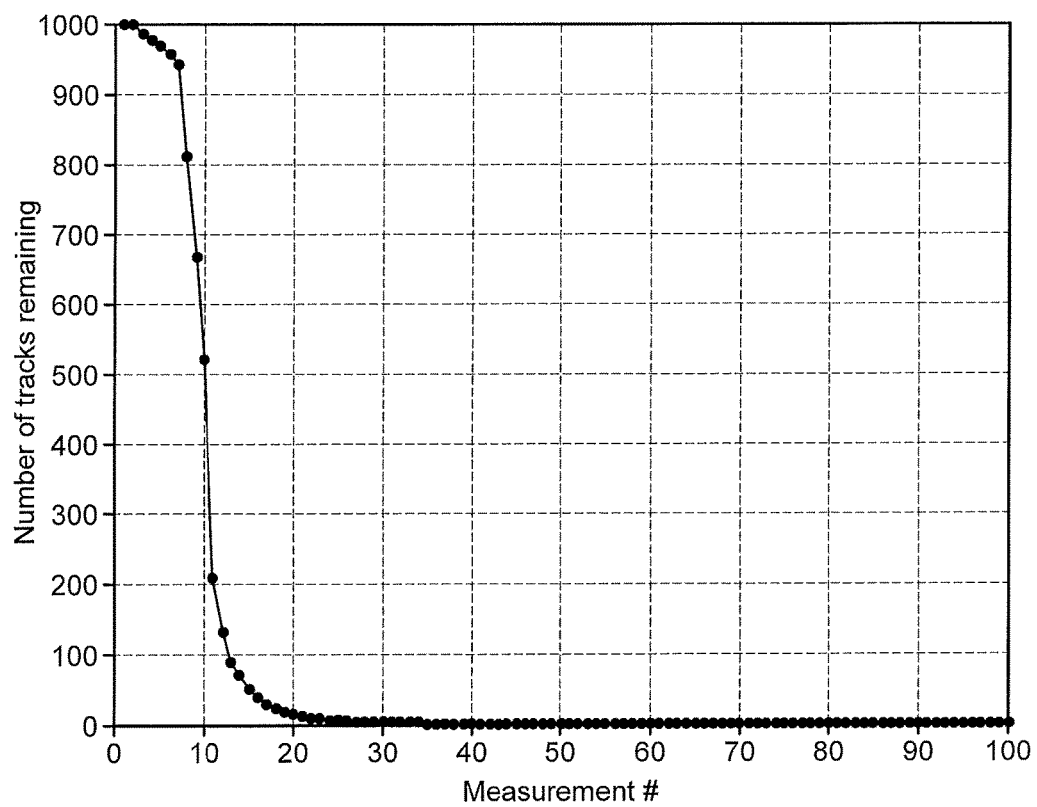
FIG. 5 is a representation of an experimentation utilizing one thousand launch point and the number of measurements taken by the platform wherein the number of remaining tracks decreases rapidly after about the tenth measurement.

As depicted in FIG. 5, when beginning with one thousand EKF starting points per row and the emitter location at point 30,40 relative to the X,Y plot, the geolocation system quickly winnows out the lost cause tracks that are unable to locate the true target location represented by a cross and is shown that after about thirty measurements, ultimately one track survives and migrates to a correct point which is indicated by the track line of the best EKF as seen best in FIG. 6. Experimentation of FIG. 5 and FIG. 6 was accomplished with an array 12 having a spaced apart distance between the respective antennas of one hundred wavelengths.

Figure 7:
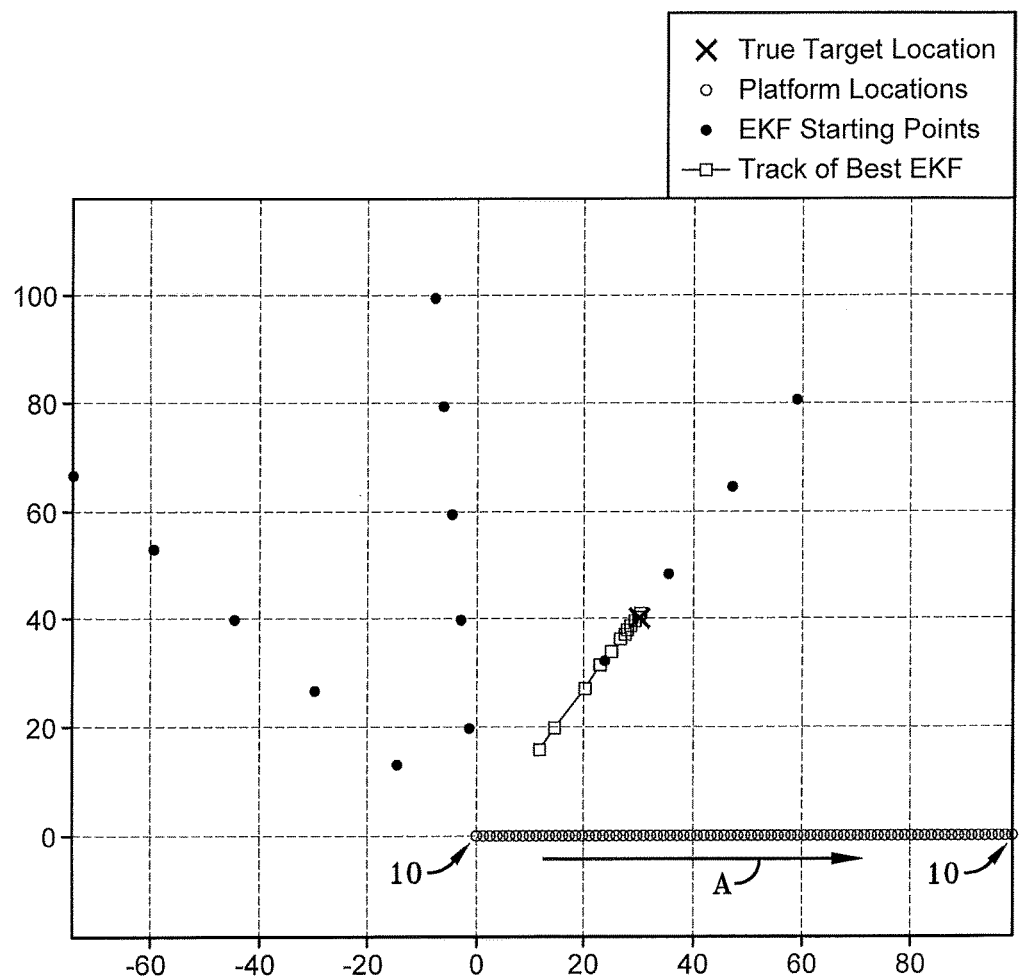
FIG. 7 is a graph of another exemplary experimentation starting with fifteen EKF initial launch points.
Figure 8:
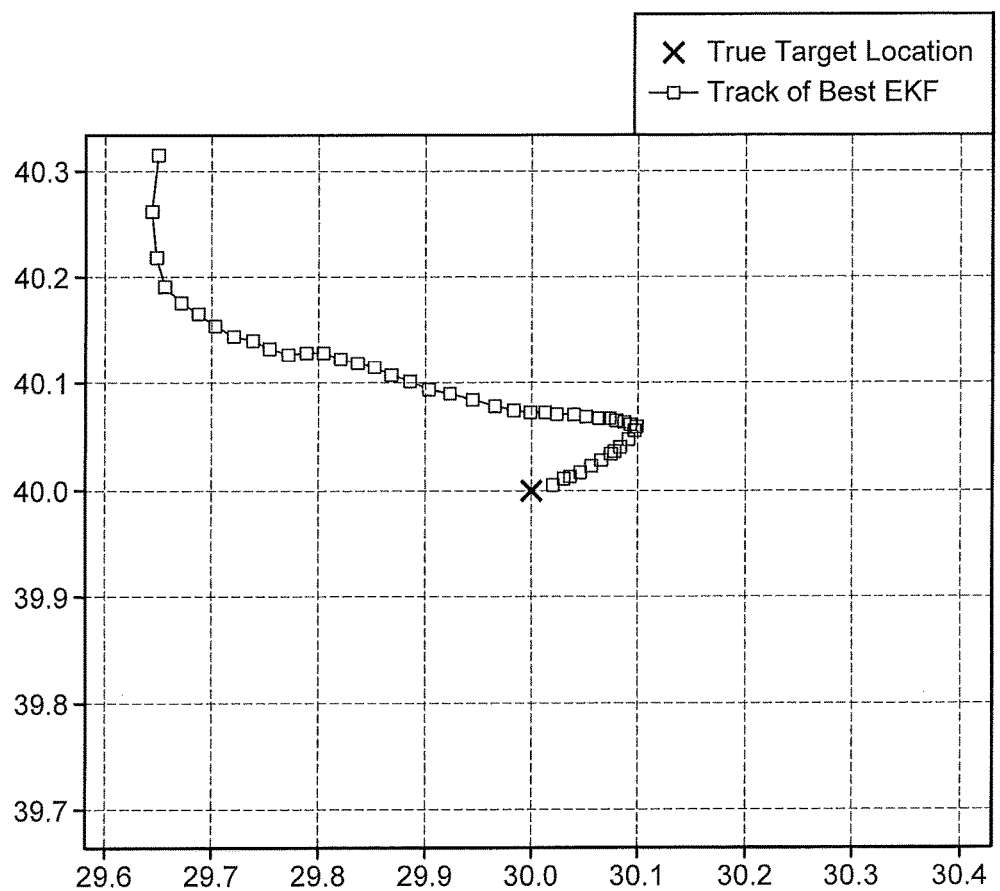
FIG. 8 is an enlarged detail graph of the experimentation of FIG. 8 depicting after the Kalman filter CIGL process has switched from the extreme geo program over to the CIGL program to provide a more precise finding of the true target location.

FIG. 7 and FIG. 8 depict the results of an experimentation indicating that the geolocation system of the present disclosure may be accomplished using less EKF starting points than one thousand. In the particular embodiment of the experimentation depicted in FIG. 7 and FIG. 8, only fifteen EKF starting points were utilized and the experiment was performed with an antenna array 12 with a 1.5 wavelength spaced separation distance between the antennas. FIG. 7 indicates that the platform 10 moves in the direction of arrow A from the starting point of 0,0 to an endpoint of 100,0 taking snapshots along the way, as represented by the multiple circles identifying the platform 10 locations. In doing so, the fifteen EKF track starting points are able to track the best EKF and establish the true target location represented by the cross at position 30,40. FIG. 7 establishes the best track EKF by utilizing the extreme geo program described herein above. As indicated in FIG. 8, an enlarged portion of the graph of FIG. 7 tracks the best EKF. In the instance of FIG. 8, the graph is depicting the geolocation system of the present disclosure after it has switched from the extreme geo program 44 over to the CIGL program 46. As described above, the CIGL program is a more detailed process that utilizes phase and amplitude information to define a more precise true target location represented by the X at position 30,40. As can be seen, the track of the best EKF in FIG. 8 utilizing the CIGL has more position points along the tracking line. These tracking points are closer together, indicating that more processing power would be required to run the CIGL program 46. Hence, the combination of the extreme geo program 44 to track the best EKF around a global peak of a projection surface. Switching over to the CIGL program 46 provides robust processing for target locations rather than simply using the CIGL then entire time.

Figure 9:
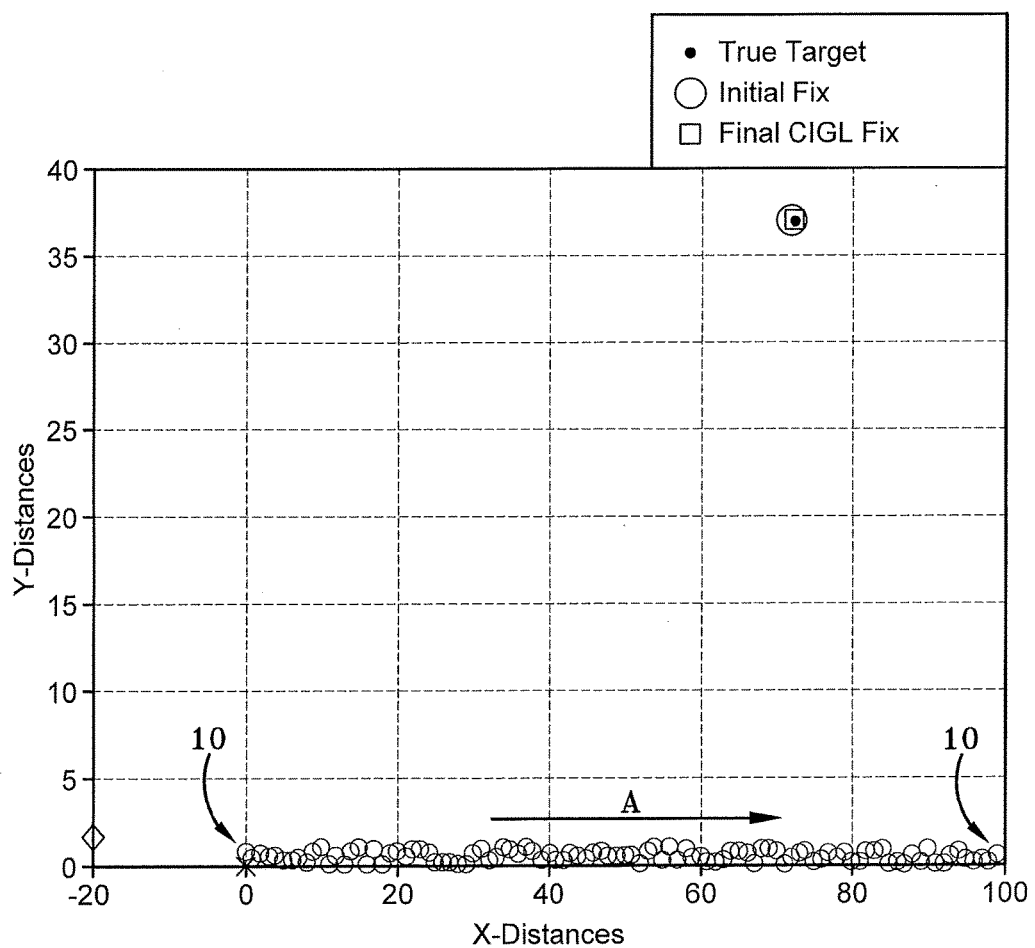
FIG. 9 is a graph of an experimentation performed by the Kalman filter CIGL process of the present disclosure depicting an exemplary simulation of the Kalman filtered CIGL program without the benefit of phase compensation.
Figure 10:
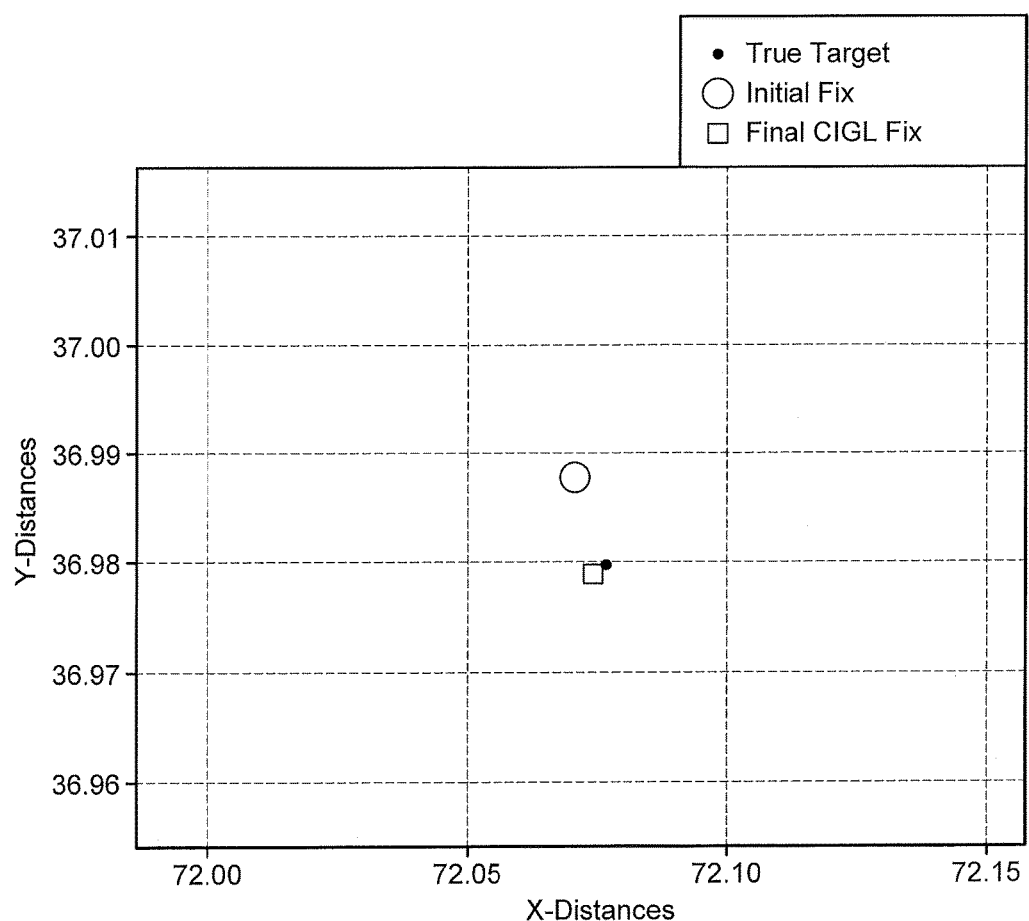
FIG. 10 is a graph depicting an enlarged detail of the solution of the problem detailed in FIG. 9.

FIG. 9 and FIG. 10 collectively represent an exemplary simulation of an experiment utilizing the Kalman filtered CIGL process 40 of the present disclosure without the benefits of phase compensation received from the signal. In these scenarios, the antenna array 12 had equidistant antennas spaced at one hundred wavelengths. The results were performed in a two antenna array. The platform 10 locations are indicated as moving in the direction of arrow A as best seen in FIG. 9. As best seen in FIG. 10, the true target location is at about point 72.055,36.98 and it can be seen that the initial fix location can be improved upon by running the Kalman filtered CIGL process 40 to establish the final CIGL fix location as indicated by the square. The final CIGL fix location is significantly close to the true target indicated by a point in FIG. 10.

Figure 11:
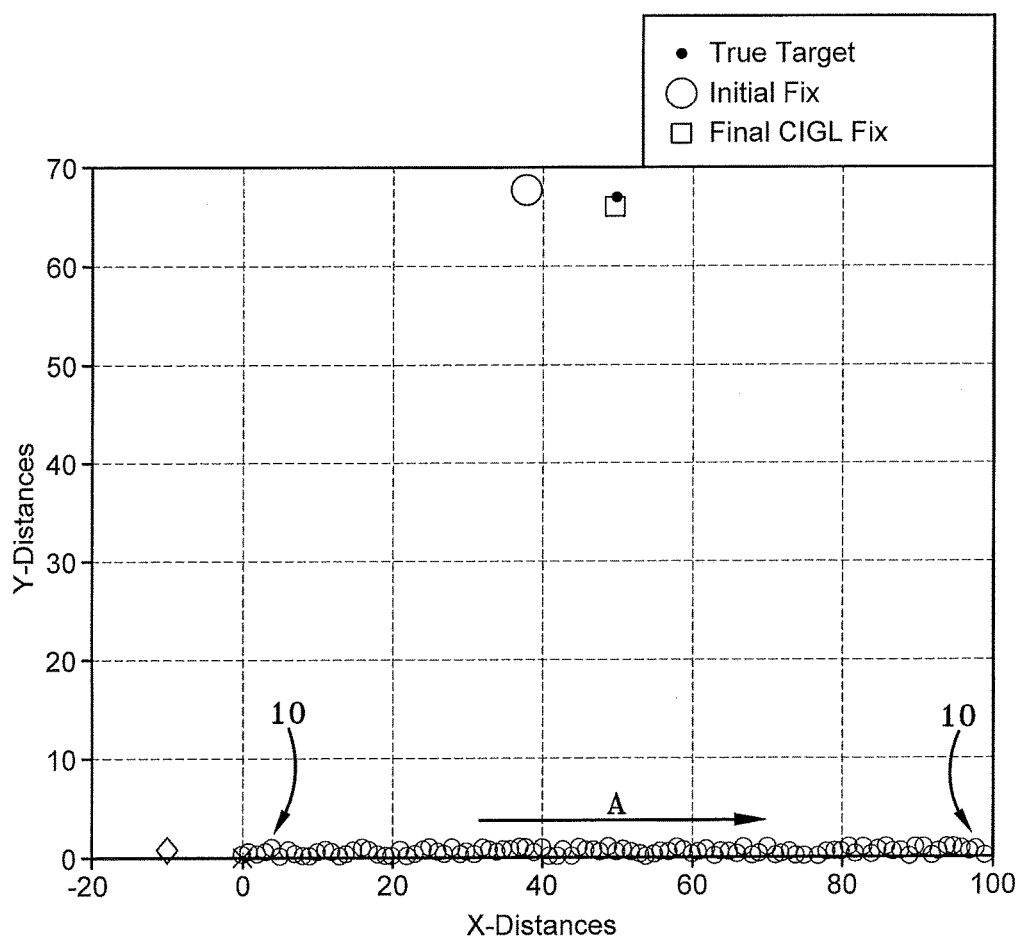
FIG. 11 is a graph of a second exemplary Kalman filtered CIGL solution without the benefit of phase compensation utilizing a four antenna array.

FIG. 11 is similar to the results of FIG. 10 except for the use of a four antenna array 12 also having a one hundred wavelength distance between the antenna units. As is seen after the final CIGL fix using the Kalman CIGL process 40, the true target location is closely identified.

Figure 12:
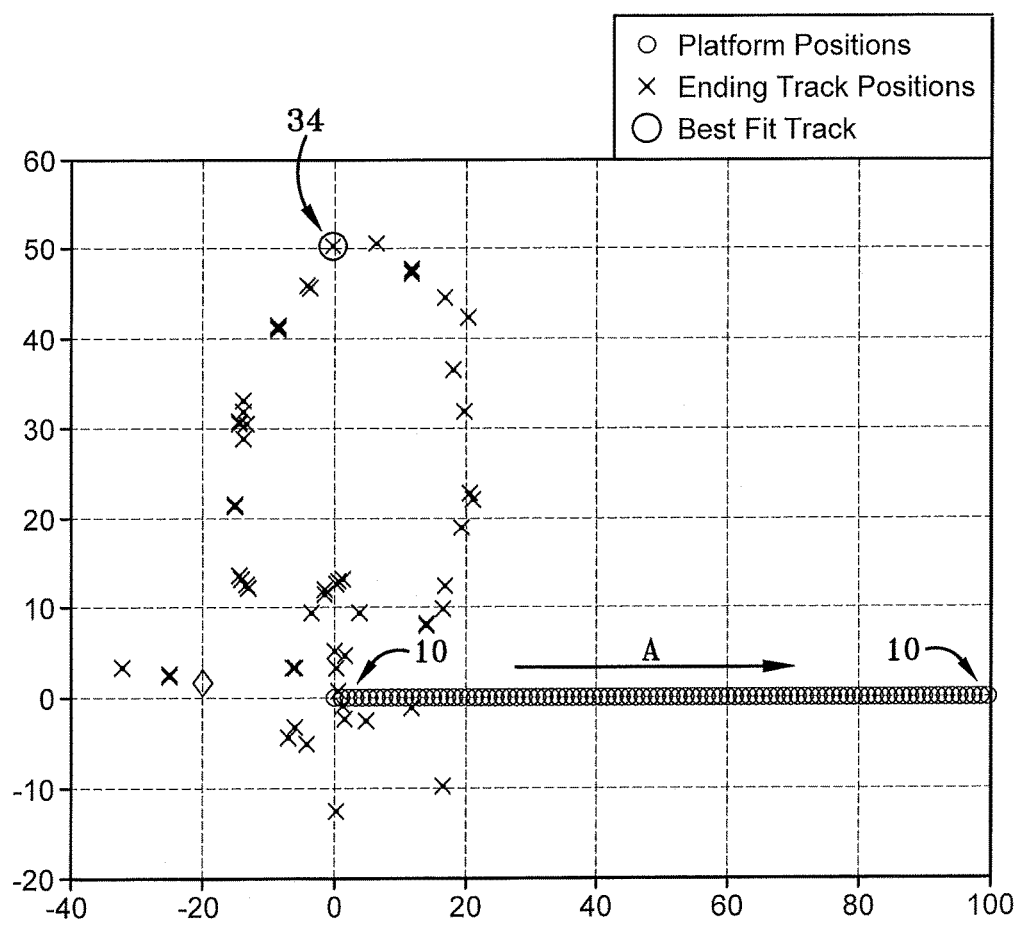
FIG. 12 is a graph of another exemplary solution to an experimentation detailing the geolocation against multiple co-channel emitters.

FIG. 12 represents the simulated results from the Kalman CIGL process 40 used for geolocation in accordance with the present disclosure against multiple co-channel emitters. In this scenario, the experimentation utilized a nine wavelength spaced apart distance uniform array 12 with a five degree phase measurement standard deviation. Similar to the other embodiments, one hundred measurements were obtained from a single moving platform 10 moving in the direction of arrow A from point 0,0 to point 100,0. The signal emitter 34 is located at point 0,50 and ninety EKF tracking filters were initially launched. The best track fit indicated by the larger circle after running the Kalman CIGL process 40 provided a best fit track position at the point −0.03,50.34.

Figure 13:
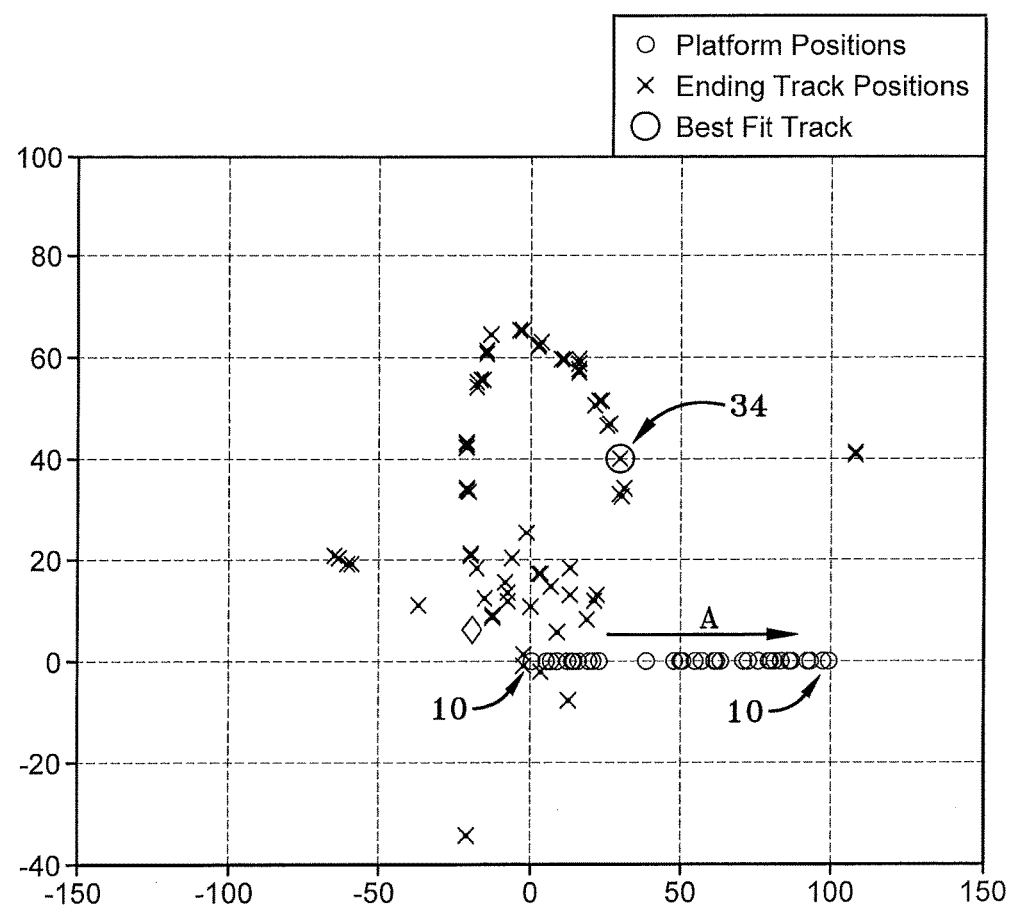
FIG. 13 is a graph of the second emitter location processed from the experimentation identified in FIG. 12.

The experimentation of FIG. 12 further continued as indicated in FIG. 13, which adds a second emitter at point 30,40. After the first emitter is found, the remaining platform measurements are used to find the second emitter located at point 30,40. Because most of the remaining cuts are actually attributable to the second emitter, converging to the second emitter location is usually rapid. The results from the Kalman filter CIGL process 40 establish a second emitter location at point 30.04,40.03.

Figure 14:
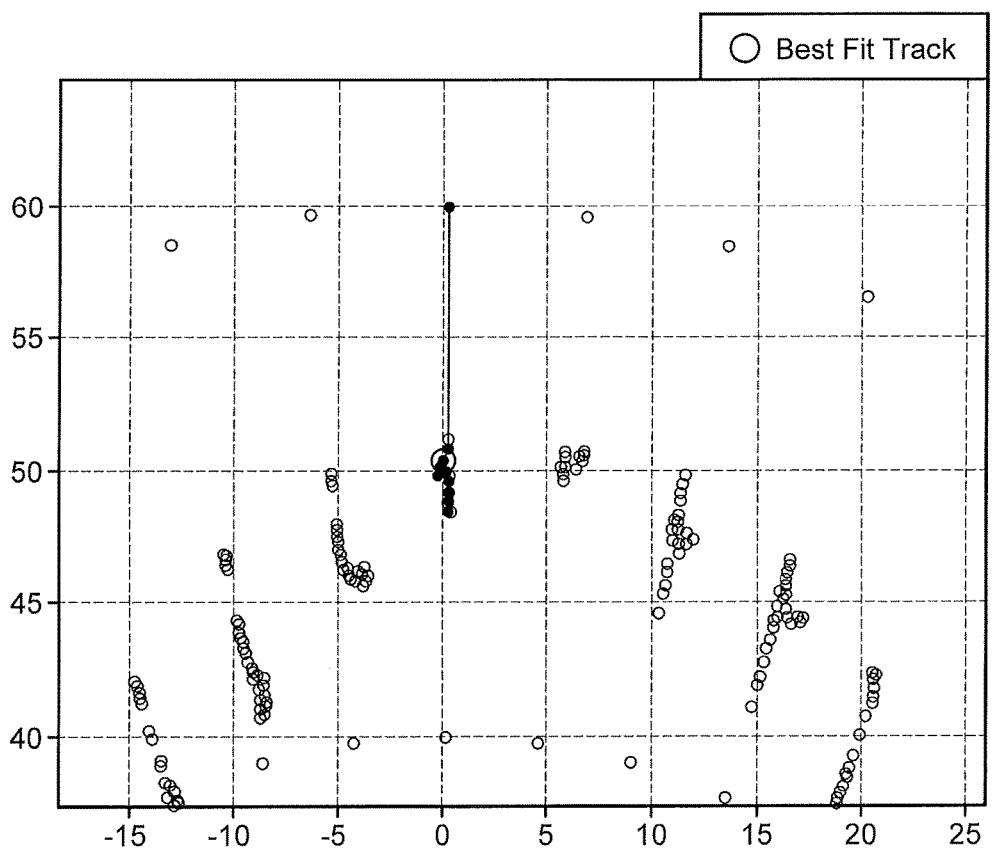
FIG. 14 is an enlarged detail graph depicting the best fit track for the location of a first emitter identified in FIG. 12.
Figure 15:
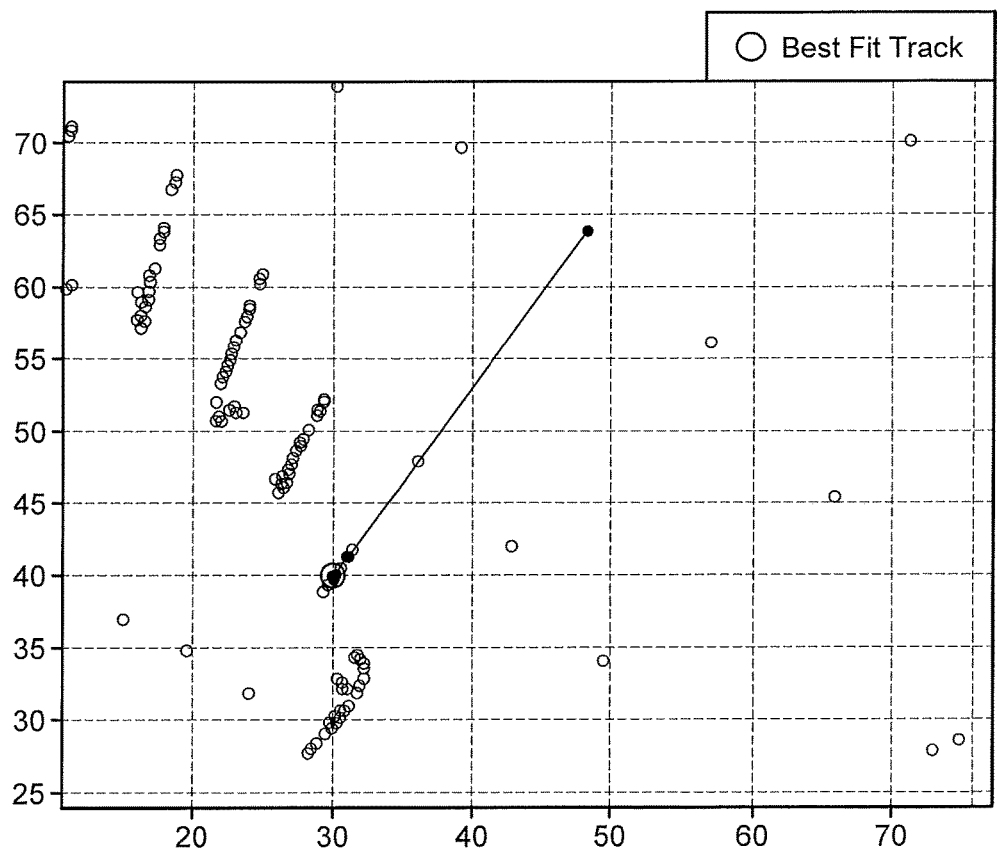
FIG. 15 is an enlarged detail graph of a best fit track locating the second emitter depicted in FIG. 13.

FIG. 14 and FIG. 15 depict the zoomed in detail of the best fit tracks of the filtered trajectories for both emitters. FIG. 14 is associated with the emitter location best fit track process of FIG. 12 and FIG. 15 is associated with the emitter location best fit track process of FIG. 13 for locating the second emitter at point 30,40.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the disclosure is not limited to the exact details shown or described.

What is claimed is:

1. A geolocation method comprising:
   receiving signals from an emitter;
   establishing an observation pattern defined by a plurality of estimated location points of the emitter;
   associating at least one Kalman filter with the plurality of location estimation points;
   predicting at the Kalman filter a predicted signal characteristic;
   observing an actual signal characteristic emitted from an object at an unknown location at the Kalman filter;
   correlating the actual signal characteristic with the predicted signal characteristic;
   creating a surface projection comprising approximate local peaks and an approximate single global peak with an extreme geo program using a portion of the actual signal characteristics;
   switching from the extreme geo program to a Correlation Interferometry Geolocation (CIGL) program for a region around the approximate single global peak; and
   locating the global peak of the surface projection with the CIGL program and associating an actual location of the object at the global peak of the mapped surface.

2. The geolocation method of claim 1, further comprising:
   associating one Kalman filter with a first location estimation point;
   receiving the actual signal characteristics at the first location estimation point with an antenna array; and
   wherein if correlating the actual signal characteristic at the first location estimation point with the predicted signal characteristic exceeds a threshold, then recording an amplitude and phase of the actual signal characteristics at a first time.

3. The geolocation method of claim 2, further comprising:
   associating one Kalman filter with a second location estimation point;
   receiving the actual signal characteristics at the second location estimation point with an antenna array;
   wherein if correlating the actual signal characteristic at the second location estimation point with the predicted signal characteristic exceeds a threshold, then recording an amplitude and phase of the actual signal characteristics at a second time later than the first time; and
   combining actual signal characteristics at the first and second location estimation points to build the surface projection.

4. The geolocation method of claim 3, wherein the extreme geo program combines the actual signal characteristics at the first and second location estimation points to build the surface projection.

5. The geolocation method of claim 3, further comprising:
   focusing the surface projection around the global peak with the CIGL program utilizing phase and amplitude information from the actual signal characteristics to form a focused surface projection.

6. The geolocation method of claim 5, further comprising narrowing the phase and amplitude information from the actual signal characteristics to signals received near the global peak such that the focused surface projection does not include any of the local peaks.

7. The geolocation method of claim 6, further comprising determining the actual location of the object from the focused surface projection.

8. The geolocation method of claim 7, wherein the extreme geo program maximizes a correlation surface the signal characteristics observed at the Kalman filter.

9. The geolocation method of claim 8, wherein the CIGL program develops a more precise calculation of the global peak when the CIGL program is initiated near the global peak.

10. The geolocation method of claim 6, wherein correlating the actual signal characteristic with the predicted signal characteristic is processed if correlating exceeds a minimum correlation value of about at least 0.85.

11. The geolocation method of claim 10, wherein the minimum correlation value is at least 0.9.

12. The geolocation method of claim 1, wherein each Kalman filter is embodied in a software program.

13. The geolocation method of claim 1, wherein observing the actual signal characteristics is performed by an antenna array.

14. The geolocation method of claim 13, further comprising
positioning a first antenna in the antenna array a first distance from a second antenna in the antenna array, wherein the first distance is a selected wavelength relative to the actual signal characteristics.

15. The geolocation method of claim 14, wherein the first distance is in a range from 1 to 2 wavelengths of the signal from the emitter.

16. The geolocation method of claim 14, wherein the first distance is 100 wavelengths.

17. A geolocation system comprising:
a first antenna and a second antenna spaced apart by a first wavelength;
an emitter at an unknown location emitting a signal having an amplitude and a phase, wherein the first and second antenna intercept the signal;
a plurality of initial guess locations of a location of the emitter;
a plurality of Kalman filters, wherein at least one Kalman filter is associated with the plurality of initial guess locations;
a correlation metric associated with the Kalman filter adapted to provide a likelihood of whether the initial guess locations are likely to identify an actual location of the emitter;
a first snapshot at a first time capturing the amplitude and phase of the signal at the first and second antenna relative to a corresponding first guess location from the initial guess locations when the correlation metric for the Kalman filter at the first guess location exceeds a predetermined threshold;
a second snapshot at a later second time capturing the amplitude and phase of the signal at the first and second antenna relative to a corresponding second guess location from the initial guess locations when the correlation metric for the Kalman filter at the second guess location exceeds a predetermined threshold;
an extreme geo program identifying a global peak and at least one local peak of a surface projection using at least the amplitude of the emitted signal;
a Correlation Interferometry Geolocation (CIGL) program identifying the global peak using the amplitude and phase of the emitted signal; and
an actual location of the emitter determined by the global peak of the surface projection identified by the CIGL program.

* * * * *